US009582757B1

(12) United States Patent
Holmes et al.

(10) Patent No.: US 9,582,757 B1
(45) Date of Patent: Feb. 28, 2017

(54) SCALABLE CURATION SYSTEM (71) Applicant: Amazon Technologies, Inc., Seattle, WA (US)

(72) Inventors: Petra Elisabeth Holmes, Cambridgeshire (GB); Andrew Graham Fenn, Cambridge (GB); Andrew Hopkinson, Cambridgeshire (GB); David Spike Palfrey, Cambridge (GB); William Tunstall-Pedoe, Cambridge (GB); Neil Copland, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 397 days.

(21) Appl. No.: 14/341,595

(22) Filed: Jul. 25, 2014

(51) Int. Cl.
  *G06F 17/00* (2006.01)
  *G06F 17/20* (2006.01)
  *G06N 5/02* (2006.01)
(52) U.S. Cl.
  CPC ....................................... *G06N 5/02* (2013.01)
(58) Field of Classification Search
  CPC combination set(s) only.
  See application file for complete search history.

(56) References Cited

U.S. PATENT DOCUMENTS

| 7,013,308 B1* | 3/2006 | Tunstall-Pedoe | G06F 17/30654 707/709 |
| 7,707,160 B2* | 4/2010 | Tunstall-Pedoe | G06F 17/30654 707/999.103 |
| 8,219,599 B2* | 7/2012 | Tunstall-Pedoe | G06F 17/30654 707/603 |
| 8,468,122 B2* | 6/2013 | Tunstall-Pedoe | G06F 17/30654 707/600 |
| 8,666,928 B2* | 3/2014 | Tunstall-Pedoe | G06F 17/30654 706/45 |

(Continued)

OTHER PUBLICATIONS

Applying Case-Based Reasoning to software requirements specifications quality analysis system Hajar Mat Jani Software Engineering and Data Mining (SEDM), 2010 2nd International Conference on Year: 2010 pp. 140-144 IEEE Conference Publications.*

(Continued)

*Primary Examiner* — Michael B Holmes
(74) *Attorney, Agent, or Firm* — Knobbe Martens Olson & Bear LLP (57) ABSTRACT

A system and method is disclosed for improving automated question-answering using real-world knowledge from a knowledge base. The system can be used to answer questions from various users. The system can generate answers to these questions using data stored in a knowledge base. In some embodiments, the system is provided with a list of questions separate from any user questions. The system can be trained using these questions in advance of a user question. The system can process the presented questions to determine that it can generate high-quality correct answers. The system can take various steps to determine a high-quality answer to a question. The system can utilize human intelligence providers to improve this process, such as through a human interactive task system. Human intelligence can be used to determine that a question is understood, that a question is answered, and that the answer is of high quality.

23 Claims, 4 Drawing Sheets

(56) References Cited

U.S. PATENT DOCUMENTS

| | | | |
|---|---|---|---|
| 8,719,318 B2* | 5/2014 | Tunstall-Pedoe | G06F 17/30654 707/607 |
| 8,838,659 B2* | 9/2014 | Tunstall-Pedoe | G06N 5/02 706/47 |
| 9,098,492 B2* | 8/2015 | Tunstall-Pedoe | G06F 17/30654 |
| 9,110,882 B2* | 8/2015 | Overell | G06F 17/278 |
| 9,286,910 B1* | 3/2016 | Li et al. | G10L 25/48 |
| 9,466,294 B1* | 10/2016 | Tunstall-Pedoe | G10L 15/22 |

OTHER PUBLICATIONS

QSAR in grossly underdetermined systems: Opportunities and issues D. E. Platt; L. Parida; Y. Gao; A. Floratos; I. Rigoutsos IBM Journal of Research and Development Year: 2001, vol. 45, Issue: 3.4 pp. 533-544, DOI: 10.1147/rd.453.0533 IBM Journals & Magazines.*

A method for recognizing user requirements in telecommunication services M. Nakamura; A. Takura; T. Ohta Networks, 1993. International Conference on Information Engineering '93. 'Communications and Networks for the Year 2000', Proceedings of IEEE Singapore International Conference on Year: 1993, vol. 2 pp. 528-532 vol. 2, DOI: 10.1109/SICON.*

Reengineering training for performance improvement D. J. Kulonda Management of Engineering and Technology, 1999. Technology and Innovation Management. PICMET '99. Portland International Conference on Year: 1999, vol. 1 pp. 333-334 vol. 1, DOI: 10.1109/PICMET.1999.808330 IEEE Conference Publications.*

* cited by examiner

SCALABLE CURATION SYSTEM

BACKGROUND

A system can include various modules and components for receiving input from a user, determining the content of the input, and generating a response to the user input. The input may be a speech input. The system can include a spoken language processing system that includes an automatic speech recognition ("ASR") module that receives audio input of a user utterance and generates one or more likely transcriptions of the utterance. Spoken language processing systems may also include a natural language understanding ("NLU") module that receives textual input, such as a transcription of a user utterance, and determines the meaning of the text in a way that can be acted upon, such as by a computer application. In some cases, the input may be a textual input. Therefore, the system can include a written language processing system. The written language processing system can similarly include an NLU module that receives textual input and determines the meaning of the text in a way that can be acted upon, such as by a computer application. The system can include one or both a spoken and written language processing system.

These types of systems can include an answer generator ("AG") that processes user questions to generate relevant answers. An AG can manage interactions between a user and the system, prompt the user for information that may be required to execute various applications or perform various functions, provide response or feedback to the user, etc. For example, a user of a client device may make a spoken question asking, "Who is the President of the United States?" Audio of the spoken command can be transcribed by the ASR module, and the NLU module can determine the user's intent (e.g., that the user wants to know the identity of the president) from the transcription. The answer generator may then generate an answer to the user's question.

Generating answers to a wide variety of types of questions requires accurate and useful information. A wide variety of information sources and other ways to locate information of various types have been developed. However, such techniques are often time-consuming and/or expensive to use. In addition, such techniques can also suffer from other problems, such as providing only limited types of information, providing information that is inaccurate and/or irrelevant, etc. For example, encyclopedias and reference librarians may provide one possible source of answers, but using such sources can be time-consuming and expensive. In addition, such sources are limited in the types of information to which they have access, such as to historical information. Similarly, while online search engines can provide an abundance of information, they often provide information that is inaccurate or irrelevant, are difficult or impossible for many users to effectively use, and can be limited when retrieving various types of information. For example, such information sources may be ineffective in providing answers to many topical and special-interest questions, such as a list of restaurants of a particular type in a given geographic location that have provided great service during the prior month, suggestions on how best to use particular features on a newly released mobile phone, or an identification of a physical store in a geographical area that currently have a particular item in stock at a price that satisfies specified criteria. A system may instead develop and use its own semantic network that includes organized information taken from a variety of data sources. The answer generator may use the semantic network to generate an answer for the user in response to the user's question. This semantic network may be or include a knowledge base. Such a knowledge base may include facts or entries. However, it may still be difficult and time-consuming for a system to determine the answer to a previously unasked question or question without additional training.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to improving automated question answering for a question-answering system powered by a knowledge base. Generally described, a question-answering system may be implemented by a number of processing modules or components that obtain input regarding a question and generate an answer in response to the question. The answer can be delivered as an output. The system can use an answer generator to generate answers to questions. The answer generator can be used to manage an interaction between a user and the question-answering system. In order to improve the quality of answers generated by the question-answering system, the system may be trained by generating answers to questions prior to user-system interactions.

The system can be presented with sets of questions. The system can be automated and process the set of questions to determine an answer for each question. The system can then generate a high-quality answer for each question. The system may utilize this question-answer processing to determine what types of structured facts may be relevant for a particular question or type of question. This can allow the system to quickly generate a high-quality answer for similar questions as the system already has determined how to generate an answer for the previously presented questions. In some embodiments, the system may store the answer to each question instead of or in addition to determining what facts are useful to generate an answer to each question.

The system may process a series of automated steps when answering a question. This process can allow the system to efficiently apply unskilled human resources to improve its automated question answering. This process can be a highly scalable process. A system that can automatically perform this process may be referred to as a scalable curation system. The question answering system may include the scalable curation system. When answering questions using the automated process, the system may determine whether it understands a question, whether the question has already been answered by the system, and whether the answer is of high quality. Some of these steps may be "take action" steps, wherein the system may take action to make the question understood by the system, take action to make the system start answering the question, and take action to improve the quality of a generated answer. In some embodiments, take actions steps can be sets of steps themselves. For example, take action steps can be diagnosis steps, wherein the system determines what issues are causing problems with the question-answering process. Take action steps can be remedy steps, wherein the system tries to solve the particular issue.

For each question presented to the system, the system may first determine whether it understands the question. If the system does not understand the question, the system may take action such that the system is able to understand the question. For example, the system can reformat the question in order to determine the most likely meaning of the question. This can be helpful when trying to understand a poorly-worded question, or a question with grammatical errors. The system can determine what class of questions this question belongs to. In some embodiments, the system can examine the formatting of the question and search for certain keywords in order to determine what class of questions this question belongs to. The system can update itself so that it will recognize this question variant in the future.

The system can utilize human intelligence resources to determine whether the question is a variant of an understandable question. Human intelligence resources can be accessed using a human interactive task system. The human intelligence resources can be unskilled. The human interactive task system allows the system to assign simple tasks to humans. A human can complete one or more tasks for the system in exchange for monetary payment. Human intelligence can be more efficient than computers for certain tasks. The system can utilize its own automated subroutines within the automated question-answering process instead of using a human interactive task system. The system can determine that a relationship is missing from the question. The system can create a relationship with properties similar to a relationship that the system already understands and can process.

In some embodiments, once the system understands the question, the system can determine whether it can answer the question. The system may have generated an answer to the same question in an earlier set of questions. The system may have generated an answer to the same question in prior user-system interactions. The system may have generated an answer to a similar question, and can easily determine the answer to this question using the same types of information. The system may have stored data relevant to answering the question.

If the system cannot answer the question, the system must determine what kind of information it needs to answer a question. For complex questions, the system may need to break the question down into a series of questions, such as subquestions, related to the original question. Answering the complex question can require determining the answer to one or more questions that are part of the complex question. For example, if the question is, "Where was the President of the United States born?" the series of related questions may include, "Who is the President of the United States?" and "Where was Barack Obama born?" The system may then determine an answer to each of those related questions. The answers to these questions may be used to determine an answer to the original question.

Once the question has been answered by the system, the system can determine the quality of the answer. For example, in some cases answer quality is classified as low, medium, adequate, high, etc. In some cases, answer quality indicates a confidence level or probability that the answer is correct. In some cases the answer quality includes both a classification and a confidence or probability. While any of the steps in such processes may involve the use of a human interactive task system, use of human intelligence may be particularly helpful at this step. The system may send the question-answer pair to a human interactive task system. The system may alternatively use other processes for identifying whether the answer is a high-quality answer. An answer may not be high quality if the answer is incorrect. The answer can be incorrect because of an issue associated with the answer. Such issues can include the system has misunderstood the question, the system is missing some fact or information needed to answer the question, the system relied upon erroneous facts to generate this answer, etc. Once the system has determined one or more issues associated with the answer, the system can take steps to remedy such issues, such as determining whether the facts used to answer the question were correct.

Though the system may use the above process when answering questions presented to the system in set form, the system may use the same process when answering a question posed by a user in real-time. The system may determine whether it understands the question and can answer to the question. If the system cannot immediately answer to the question, the system may give the user the option of deciding whether the system should determine an answer to the question, as a complex question may take some additional processing time. If the user indicates that he or she wishes to know the answer to the question, the system can deliver a notification to the user when the answer has been determined. In some embodiments, if the user indicates that it does not want the system to answer the question, the system may add the question to the queue of training questions that the system may process.

Although the examples and embodiments described herein will generally focus, for the purpose of illustration, on determining answers to questions in the music field, e.g., albums, artists, etc., one skilled in the art will appreciated that the techniques described herein may be applied to other processes, methods, or systems. For example, the techniques may be used with any type of question, may be used to train the system in advance of user interaction, may be used to improve answers generated in response to user questions, may be used with inputs that are not in the form of a question, etc. Various aspects of the disclosure will now be described with regard to certain examples and embodiments, which are intended to illustrate but not limit the disclosure.

Scalable Process for Improving Automated Question-Answering

Figure 1:
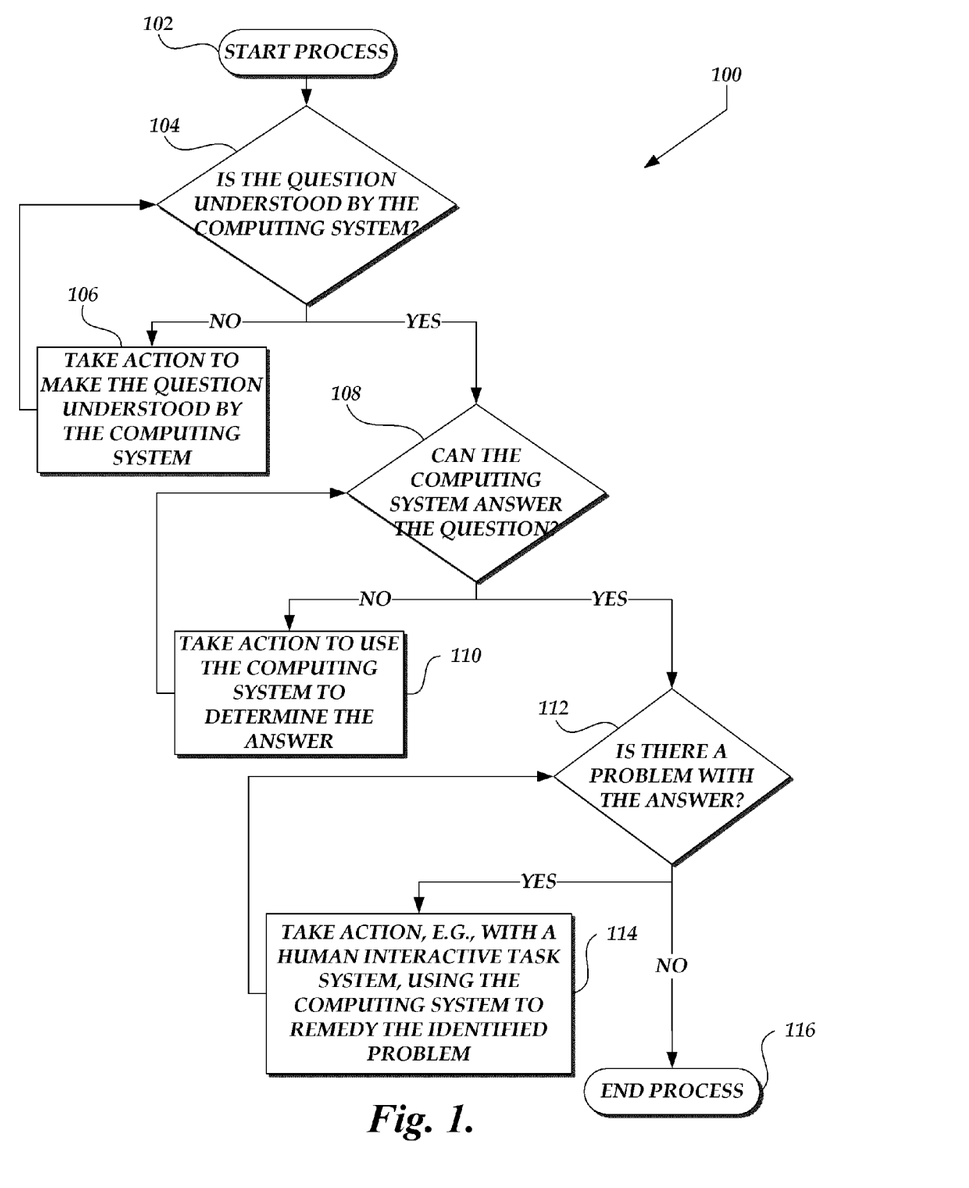
FIG. 1 is a flow diagram of an illustrative process for using a scalable curation system to generate a high-quality answer to a given question.

FIG. 1 illustrates a flow diagram depicting a process 100 for improving automated question answering. The process may be scalable. In some embodiments, the process can utilize unskilled human resources. The system can include multiple subparts making up a single system. The subparts of the system can be different systems that work together. The system can include multiple subparts, some of which are different systems that work together. The system running the process can be a question answering system containing a scalable curation system for executing the process. The system running the process can be a scalable curation system separate from the question answering system. The question answering system can also be the scalable curation system. The question-answering system can be powered by a knowledge base and an answer generator. The system can be an automated system. In some embodiments, the scalable process involves feeding the system a set of questions. The system can process the set of questions to determine an answer for each question. The process 100 can be used to generate a high-quality answer for each question. In some embodiments, the system may store the answer to the question. For example, the system may store the value "1942" as the answer to the question, "When was Paul McCartney born?" More commonly, the system may use this question-answer processing to determine what types of structured facts are relevant for a particular question or type of question within the set of questions. The system can update its knowledge base with additional facts and information when the system determines that it needs such facts to answer a question. Allowing the system to process such sets of questions can improve the quality of answers given in response to actual user questions. While this process 100 is preferably used when the system is processing sets of questions, the process 100 can also be used to generate high-quality answers to user questions in real-time (e.g., the system may generate answers to a question shortly after receiving the question, such as but not limited to within a second, five seconds, ten seconds, one minute, one half hour, one hour, etc. after receiving such questions).

The process 100 begins at block 102. The process 100 may be embodied in a set of executable program instructions stored on a computer-readable medium, such as one or more disk drives, of a computer system. When the process 100 is initiated, the executable program instructions can be loaded into memory, such as RAM, and executed by one or more processors of the computing system. As mentioned above, the system can receive a set of questions at block 104. The system can process each question to determine a high-quality answer to the question. The computer system may send and/or receive information to and/or from a human interactive task system in connection with any one of these steps.

At block 104, the computing system determines whether it understands the question. If the system does not understand the question, the computing system may take action to make the question understandable to the system at block 106. Take action steps can themselves be sets of steps. There may be two main types of steps that make up take action steps. There may be diagnosis steps, which help determine whether particular issues are causing problems, and there may be remedy steps, which fix the issues. In some embodiments, the diagnosis and remedy steps can come in pairs. In other embodiments, there may be a series of diagnosis steps before a single remedy step is identified. There may be one broad diagnosis step that allows the system to identify many remedy steps.

Various conditions may cause the system to be unable to answer the question. For example, the system may determine that it is unable to classify the question. The system may classify the question using various relationships. The system may determine that it does not understand a relationship in the question. For example, the system may be missing a relationship in the question. The system may have incorrectly identified a relationship in the question. The system may analyze the question to create a relation with properties similar to a known relation. This may allow the system to correct a missing relationship. Templates for answering the question may be associated with the system. The system may determine that the question does not match one or more templates associated with the system. The system may determine that part of the question does not match one or more templates associated with the system. The question may include one or more entities. The system may determine that it is unable to understand an entity in the question. The system may be unable to choose between two or more possible interpretations or understandings of the question.

In some embodiments, the system may not recognize the format of the question. The system can adjust the formatting of the question such that the question can be properly processed by the system. For example, the question can be in an unusual format, such as, "Was the song 'Hey Jude' when released?" A language processing subsystem can use language processing to determine the most likely meaning of the question. The language processing subsystem can use a natural language understanding module to determine a semantic meaning. This allows the language processing subsystem to determine the most likely meaning of the question. For example, the above question can be reformatted as, "When was 'Hey Jude' released?" The system can include such a language processing system.

The system can utilize a human interactive task system to determine whether the question is a variant of an understandable question. For example, the system may request the human intelligence resource to give one or more alternative equivalent phrasings of the question. The system can then determine whether it understands any of these variants of the question. In some embodiments, the system may not require human intelligence to determine whether the question is a variant of an understandable question. For example, the system may automatically alter the question. The system can alter the question by removing words from the question, replacing words with synonyms, removing stop-words such as "a," "an," and "the," stemming the question, etc. The system can then determine whether the altered question is in a format that is understood by the system.

The system can update itself so that the system will recognize this question variant in the future. The system can contain one or more translation templates. A translation template allows the system to convert a class of questions into a machine-understandable representation of the meaning of the question. The system can improve the relevant translation template by adding optional stop-words to the translation template. For example, the system can add the stop words "at," "which," and "on" to the translation template. The system can add synonyms that were not previously known by the system to the system's internal knowledge base. Such actions can occasionally lead to false understandings, however. As a result, such updating should only be performed as part of the process in applications where thorough coverage is more important than system accuracy. Utilizing a human interactive task system in set processing can improve this understanding accuracy without damaging the accuracy of the system.

In some embodiments, the system can determine a class of questions to which this question belongs. For example, the system can separate questions into classes related to music, movies, entertainment, maps, weather, current events, etc. The system can determine that the question belongs in the music class. In another more specific example, the system can determine that the question is related to release dates of various songs.

In some embodiments, the system can determine what type of question the system has been presented with by examining the formatting of the question. The question may have content slots and carrier slots. For example, the system may be processing the question, "When was the Beatles's album 'Yellow Submarine' released?" The carrier slots in that question, e.g., "when," "was," "album," "released," etc. indicate that the user is interested in knowing the date of some music album. Content slot values, such as "the Beatles" and "Yellow Submarine," indicate what artist and what album makes the question unique (the values of the content slots could easily be changed to words like "the Rolling Stones" and "Exile on Main Street," or to generic class tokens like "Band" or "Album"). The system can quickly classify a question based on certain words associated with different carrier slots (music titles, movie titles, weather, directions, etc.), and determine what type of information it needs to answer the question (dates, in this instance). In this example, the system can then search for specific dates associated with the Beatles and the album "Yellow Submarine" in order to determine the answer to the presented question.

In certain embodiments, the system can use automated methods to identify and create a missing relationship in the question. For example, the system may not understand the question, "What is the administrative capital of France?" However, this question may be closely related to the question, "What is the capital of France?" The system can create a relation, such as [is the administrative capital of]. This relation may have similar properties to the relation [is the capital of], which the system understands and can process. By creating the relation and associating it with properties similar to known relations, the system may generate a missing relation. In other embodiments, the system may utilize human intelligence to collect a text response to the question, e.g., Paris, when the system is missing a relationship necessary to generate an answer the question. This text response may not have additional properties associated with it. The system may store this as the answer to the question but may not further understand the question. In some embodiments, the system may correct an incorrect relationship in the question by adjusting properties associated with one or more relations in the question.

The question may contain one or more entities. An entity may contain certain words or information that allow the system to classify what type of question the question is, or to determine what type of information it requires to answer the question. As mentioned above, one or more templates may be associated with the system. These templates may be used to translate one or more classes of questions into a machine understandable representation of the meaning of the one or more classes of question. If a question of the system would have been understood if the entity had been recognized by the system, then the "translation trace" feature of the system can be used to see what translation templates the question matched. The system can extract the condition questions of these templates. The system may be associated with a knowledge base. The knowledge base may contain information related to different entities. The different entities may be associated with one or more flags identifying various properties associated with the entity. The question may include one or more question strings. The system can analyze these questions to determine which string did not resolve, what the expected name and class is for an entity, etc. When these details have been obtained, the system can take further steps such as: investigating its internal knowledge base for entities which satisfy certain constraints but have the rareness flag set on the lexical fact; look in its internal knowledge base for entities which satisfy the constraints and have a denotational string that is similar to the string used in a question; look in the database for entities which satisfy most of the constraints but not all; automatically create a new knowledge base entity satisfying all constraints if they are enough to define a valid object, show human intelligence the entity name and constraints through a human interactive task system and ask for details about the entity to add it as a valid object to the knowledge base, etc. The system may identify alternative strings related to an entity in the question.

The knowledge base may contain various entities. The knowledge based may alternatively or additional contain denotational facts indicating certain information. Denotational facts can be incorrect when the facts are incorrectly tagged in the system's internal knowledge base. Various facts and entries within the database may be tagged or flagged with one or more flags and datastrings. The flags may be associated with or indicate various properties or information for the facts and entities. A "rare" flag may be set for a string that does not normally refer to a particular fact or entity. For example, "paris" can denote Paris, Tex., or Paris, France. The datastring associated with Paris, Tex. is the type of datastring that can be referred to as rare. When importing facts into a database, strings may normally be set as non-rare. However, strings may be set as rare if they have already been marked as normally only denoting particular entities. For example, "paris" may denote Paris, France. The system may also mark certain datastrings that do not normally denoting any entities, such as "what."

In some embodiments, the system can automatically use external database resources, such as search engines, to detect when a string should be rare for a media entity. The media entity can be, for example, a song title, book title, movie title, etc. The system can call up a search engine application program interface and generate a question for the search engine. The question can be built from the title and the class of the entity. For example, the question can be "yesterday song," indicating the entity is a song and that the title is "Yesterday." If the title and the creator's name do not appear together in a snippet for any of the high-ranked search results output by the search engine, the system can set the denotational fact as rare for that entity.

Once action is taken by the system to make the question understandable, at block 104 the system can determine whether this action actually made the question understood by the computing system. If so, the system can proceed to the next step in the process. At block 108, the system may determine whether the system can answer this question. For example, the system may have previously generated an answer to this same question in an earlier set of questions, and stored the relevant information in the system's knowledge base. In some embodiments, the system may have generated an answer to a similar question in an earlier set of questions. For example, the system may have previously processed a question such as, "When was President Obama born?" If the system receives the same question (or a question with similar formatting asking for the same information) in the future, the system can answer the question and verify whether the answer is of high quality. In some embodiments, the system may have previously processed a question such as, "When was President Obama born?" The system may now be processing a similar question, such as, "When was President Clinton born?" The system may use the processing information from the previous question, as well as the structure facts from this question, to easily determine the answer to this question as well, though different data may be required. The system can utilize information stored in a knowledge base contained within the system.

If the system cannot answer the question, the system can take action to start determining the answer at block 110. The system may start determining the answer by determining the types of information required to answer the question. This may be a simple process. For example, if the question is, "When was President Obama born?" the system only needs two types of data to determine the question: who President Obama is (Barack Obama), and when Barack Obama was born (1961) in order to determine an answer to the question. These types of data may be used to determine the answer by creating an inference chain. The system may determine that it cannot answer the question until it finds out when Barack Obama was born, as the system may not currently have that information. The system may use inference rules to determine an answer to the question. For example, the system may first determine that the President is Barack Obama. The system may then determine that Barack Obama was born in 1961. The system may determine that there is a problem with the inference chain used in determining the answer. The system may take action to remedy this problem such that the system can determine an answer to the question. For example, the system may have tried to determine when the current president was born. This may not be the president the question is referencing, e.g., may not be Barack Obama. The system may then adjust the inference chain to first determine about which president the question is referring to.

The question may be complex. The system may separate a question into different classes. The system may generate a different question associated with each class. The question can involve many unrelated pieces of information. For example, the initial complex question presented to the system can be, "Who was the president of the United States when Barack Obama was a teenager?" In another example, the complex question can be, "Who is married to the daughter of the director of 'Jurassic Park?'" The system may understand these questions and recognize that these types of questions translate to multi-line questions. Each question can be separated from the question and can be treated as a question related to the original question, e.g., a sub-question. In some embodiments, one question, called a canonical question, can be built and added to the set of questions being processed by the system. This question can be added to the set of questions that the system is processing. This canonical question may be known to go through one or more translation templates associated with the system. The canonical question may be stored with one or more templates and used for testing the template. The canonical question may often be similar enough to the question at issue to allow it to be used for identifying facts that the system is missing and that the system requires to solve the question at issue. In the Jurassic Park example, separate questions processed by the system include: "Who is the director of Jurassic Park?" "Who is the daughter of Steven Spielberg?" and "Who is Jessica Capshaw?" By answering these questions, the system may be able to answer the question, "Who is married to the daughter of the director of 'Jurassic Park'?" All objects and relationships have lexical facts that can be used to create these questions.

In some embodiments, the system can utilize information that is not stored in the knowledge base. The system can perform natural language processing on a text source to obtain additional information. For example, the system can access online databases for additional information. In another example, the system can scrap websites for additional information. In some embodiments, the system can add the additional information to its knowledge base. Before adding the additional information to its knowledge base, the system can send the additional information to a human interactive task system to verify and/or increase confidence that the information is correct.

Once the system has answered a question, the system may determine at block 112 whether there is a problem with the answer, e.g., whether the answer is of high quality. The answer quality level may be below a predetermined threshold. In some cases, answer quality indicates a confidence level or probability that the answer is correct. In some cases the answer quality includes both a classification and a confidence or probability. For example, the system may determine whether the answer to the question is correct. The system may receive information regarding the quality level of the answer from a human interactive task system. The system may receive information regarding the quality level from a user. The system may determine that the answer is factually correct or incorrect. The system may determine that the answer contains unnecessary information. The system may determine that the answer does not include necessary information. The system may determine that the answer is appropriate for the most likely understanding of the question. The system may determine that the answer is not grammatically correct. The system may determine that the answer contains unnecessary profanity. The system may determine that the answer contains duplicative information. The system may determine that the answer is not in the expected format.

In some embodiments, the system may send the question-answer pair to a human interactive task system to determine the quality of the answer. For example, the system may request the human interactive task system to score the answer using a scale (e.g., any scale, including but not limited to a scale ranging from one to six, where one indicates strong disagreement and six indicates strong agreement). The system can request that the human interactive task system provides scores for various statements about the answer. One statement may relate to whether the answer is factually correct. For example, if the user's question was, "What Is the Capital of France?" the answer, "Paris" is factually correct, but "Rouen" is not. One statement may relate to whether the answer contains unnecessary information. For example, if a user asks how old is Bill Clinton?" the answer, "Bill Clinton is 67 years old and has been married for 39 years," contains unnecessary information that the user did not request. Another statement may relate to whether the answer is missing important or necessary information. For example, if a user asks, "Where was John Adlum born?" the answer, "John Adlum was born in New York," is missing the clarification that he was born in York, Pa., USA, not York, UK. Yet another statement may relate to whether the answer is appropriate for the most popular interpretation of the question. For example, if a user asks, "When was John Adams born?" the user is most likely asking about the second president of the United States, not the former director of CERN. Another statement may relate to whether the answer is well formed using natural language and containing no unnecessary profanity. This may relate to several cases such as an answer poorly phrased, or an answer containing unsolicited profanity. A statement may relate to whether the human interactive task system would be happy with the answer if it were a user. This may be useful as a guide to differing opinions of different users. Some users require greater answer precision, while others are satisfied with more general responses. The scores from the various statements can be combined. A user may give a separate user happiness score indicating his or her happiness with the answer. The other scores may be compared to the user happiness score. The scores may be combined by weighting the contribution of each statement to the importance of what the particular statement to the user experience. The weightings may be initially set according to the system's perception of the importance of each statement to the overall user experience. By comparing the combined score of various statements to the overall score, it is possible to determine how important each statement is to a user experience. This may be optimized by minimizing the difference between the overall score in the combined score given variation in the weightings. The system may receive information regarding the quality of the answer from a user who asked the question rather than from a human interactive task system.

The system may send data used to determine the answer to a human interactive task system for verification as to whether the data is correct. For example, the system may present the human interactive task system with the name of an album, such as "Exile on Main Street," by the Rolling Stones, and ask the human interactive task system to verify whether the artist associated with the album is correct.

In some embodiments, the system may use customer information provided through one or more applications to determine the quality of the answer. In some embodiments, the system may utilize evidence collected from signals such as follow-up question refinements. The system can use automated processes such as system assessment. These automated processes may identify inconsistencies without identifying which fact in the answer is incorrect. In some embodiments, the system cannot determine an answer to the problem. If the system determines a problem with the answer, the system may take various steps to diagnose and remedy the problem. One example of such a subroutine is described in detail with respect to FIG. 2.

For example, if the answer is not a high-quality answer (e.g., its quality score, confidence score, etc. is below a predetermined threshold), the system may take action to improve the quality of the answer at block 114. The system can utilize a human interactive task system to improve the answer quality. The system can executed automated processes to improve the answer quality. Because this case can be similar to an unanswered question, the same subroutine 200 for diagnosing and remedying the problem may be used. The subroutine for diagnosing and remedying a problem 200 is explained in detail below with respect to FIG. 2.

The system may also determine whether an answer is of high quality by determining whether the formatting of the answer could be improved. For example, the system could answer the question, "Where is the Golden Gate Bridge located?" by answering, "The United States." While correct, this answer may not be high quality because a high quality answer would have much more specificity. For example, the system may instead answer the question with the answer "San Francisco." The system may generate an even more precise answer by giving the address or exact coordinates (GPS, longitude, latitude, etc.) for of the answer.

The system may improve the quality of the answer by using information stored in an external database. For example, the system may compare its generated answer to an answer found using an online search engine. The system may perform natural language processing on a text source to obtain additional information. For example, the system can scrap a website for useful information. The system may send the answer or information associated with the answer to a human interactive task system. The human interactive task system may determine whether the information is correct.

When the system has implemented a solution for the identified problem, the system may determine whether there are additional problems with the answer at block 112. The system may terminate working on a question if certain conditions apply regarding problems with the answer. For example, if the system has executed all identified remedy steps, but the diagnosis steps continue to give the same results each time they run, the system may stop the process 100 and move to the next question in the set of questions provided to it. In another example, the system may have identified remedy steps. However, the system may not be able to carry out these remedy steps because they have not been fully implemented by the system. In yet another example, the diagnosis steps may indicate that all issues with the question have been resolved, but the system is still unable to determine an answer to the question. In each of these instances, the system may terminate working on that question and move on to processing another question.

Additionally, the system may postpone working on the entire set of questions if external constraints apply. For example, the system may repeatedly move each question to the back of the system's question queue. This may happen if the system needs to access some external system, such as a networked database, which is temporarily unavailable. In another example, the system may postpone working on the entire set of questions if the system determines that resources (e.g., time, a monetary budget, etc.) for utilizing a human interactive task system has been exceeded. In such instances, the system may stop processing questions until the system receives an indication that it should start processing questions again.

The process for answering a question 100 ends at block 116. Upon answering a question, the system can move to processing the next question in its queue. Processing questions may involve non-trivial elapses of time. For example, the system may have to wait for input from the human interactive task system. Processing sets of questions at the same time can reduce the impact of this, e.g., beginning work on another question while awaiting input from a human intelligence resource for the original question.

In some embodiments, additional information can be provided about each question in order to improve processing time. This can allow the system to avoid unnecessary steps in the above process. This can allow the system to perform very specific methods that can give increased success rates for particular types of questions. For example, if all questions in a set of questions follow the form, "What was X's latest album?" then higher accuracy rates may be obtained from human intelligence by giving a human interactive task system a specific form tailored to collecting that piece of information for each X.

Figure 2:
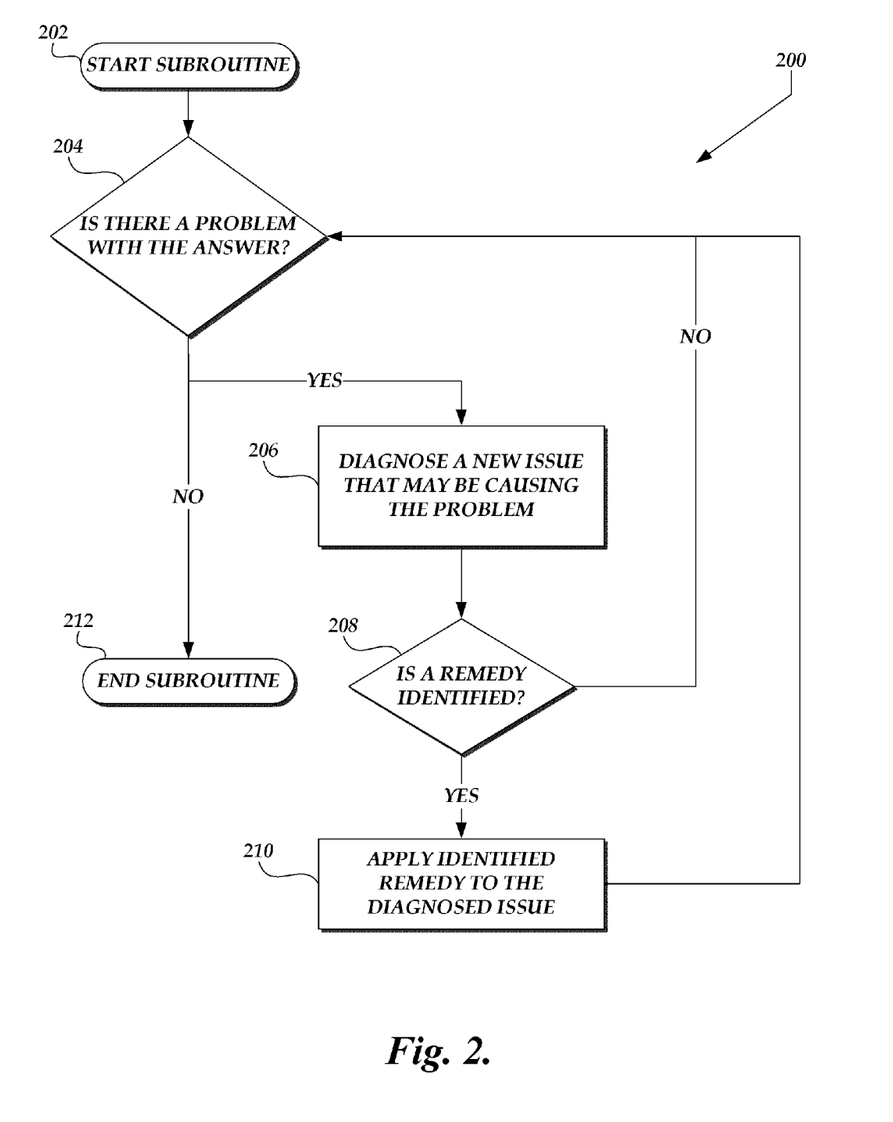
FIG. 2 is a flow diagram of an illustrative subroutine for performing diagnostic steps and remedy steps in order to resolve a problem with an answer.

FIG. 2 illustrates a flow diagram of an illustrative subroutine for performing take action steps. As mentioned above, these take action steps can include diagnostic steps and remedy steps meant to determine a problem with an answer. The same subroutine can be used to determine whether a generated answer is high quality, or whether the question is unanswered. This subroutine can occur, for example, at block 112 of process 100. The subroutine 200 begins at block 202. The subroutine 200 may be embodied in a set of executable program instructions stored on a computer-readable medium, such as one or more disk drives, of a computer system. When the subroutine 200 is initiated, the executable program instructions can be loaded into memory, such as RAM, and executed by one or more processors of the computing system.

At block 204, the system can determine whether there is a problem with the answer. If the answer is yes, the system can diagnose an issue that may be causing a problem with the answer at block 206. Multiple diagnostic steps are available to the system. For example, the system may not be able to answer a question using its knowledge base because the knowledge base is missing a certain piece of data that is necessary for answering the question. In another example, the system may have incorrectly answered a question because the knowledge base used by the system for generating an answer may contain erroneous information. In yet another example, the system may have misunderstood the question being asked, and thus generated an incorrect answer. In some embodiments, the system can determine a problem with the answer by submitting the question-answer pair to a human interactive task system. In some embodiments, the system can utilize automated processes to perform similar functions.

At block 208, the system may identify the remedy to the problem. For the above missing piece of data example, the system may determine that the missing object or datapoint must be collected in order to answer the question. In some embodiments, the system can determine what specific datapoints may be collected in order to answer the question, e.g., birthdate, location, full name, etc. The system may determine that the collected datapoint must be added to the system's knowledge base such that the system can determine the correct answer to a question requiring the same datapoint in the future.

In some embodiments, the system can determine which datapoint or datapoints must be collected by sending a question similar to the currently processing question through the system. The system can then examine the "explanation" returned by the system along with the answer to the question. The explanation can include a list of key facts and inference rules that the system used to answer the question. These facts can be checked one by one by the system. The system can determine what corresponding facts are missing for the entity in the target question. For a question such as, "Where was the lead singer of Coldplay born?" the missing fact may be the birthplace of Chris Martin. The system can then collect such information.

Translation templates, as mentioned earlier in the application, are used to convert a class of questions into a machine understandable representation of the meaning of that question. Each translation template has one or more documenter questions. A documenter question is a question that is known to go through a specific translation template. The documenter question is stored with the specific translation template. The documenter question can be used for testing the translation template. When the translation template relates to a narrow class of questions, this documenter will often be similar enough to the target question to allow the system to use it to identify the missing facts.

Another way to create a similar question can be to use canonical entities for each principal class. A canonical entity may be an entity that is known to have many facts associated with it. For example, if the original question is "How old is Lucie Flynn?" and the system only knows that "Lucie Flynn" is a human being, the system can determine a canonical entity for the class of human beings by substituting Lucie's name with that of a more famous entity belonging to the human being class, such as "Paul McCartney." The system may substitute a known entity in the question to determine whether the system can answer the question using the known entity. The system may determine a similar question to determine whether the system can answer the similar question. The system can then determine what key facts and inference rules are required to solve how old Paul McCartney is, as the system is likely to have all the necessary information for this entity. This allows the system to determine what facts it must learn about Lucie Flynn in order to use inference rules to determine the answer to that particular question.

At block 210, the system may take steps to apply the identified remedy to the issue that the system has diagnosed in the answer. In some embodiments, the system can determine what datapoints must be collected in order to answer the question. This may be particularly relevant when the question translates to a multi-line question such as "Where was the lead singer of Coldplay born?" and/or a question requiring inference such as "How old is Barack Obama?" If the system determines that a datapoint is missing from the knowledge base it uses to answer questions, the system may use automated methods, such as a web-crawler, to collect the missing object or datapoint from external databases, such as online encyclopedias, websites, dictionaries, etc. The system can then add the datapoint to its knowledge base, and use the updated knowledge base to generate a new answer to the question.

Once the diagnosed issue is resolved, the system may determine whether it has diagnosed additional issues that may be causing problems with the answer by returning to block 204. Though the system may be able to remedy a particular issue, such as the system missing a piece of information that is necessary to answer a particular question, the answer may still have issues. For example, the answer, though generated, may be of low quality. In that case, the system will return to block 206 to determine another issue that is causing the problem, and go through the subroutine 200 again. The subroutine 200 may run until the system determines a high-quality answer for the problem. While the subroutine 200 shows a diagnostic step followed by a remedy step, the process may have several diagnostic steps followed by a single remedy step, or a single broad diagnostic step followed by multiple remedy steps.

Badly answered questions, e.g., questions with answers falling below a predetermined threshold, can be processed by the system in a fashion similar to non-answered questions. If the answer to a question is incorrect, the system can collect the correct answer to a question in the same way as the system collects any facts that prevent it from answering the question in general. Similarly, the interpretation of the question can be reviewed by the system to check whether the question has been given a bad answer because the meaning of the question has been misunderstood by the system. The system may have had one or more possible interpretations of the question. The system may determine whether it is more likely that another interpretation of the question is the correct interpretation. Occasionally, the system can be presented with a question which does not have an answer. For example, the system may be presented with the question "What is the capital of Africa?" Since Africa is a continent and not a country, this question cannot have an answer. The knowledge base of the system can store information about fact patterns with zero results. The knowledge base can use this to give this information in responses.

In some embodiments, the answer generated by the system can be checked for problems. For example, if the question is, "What was Madonna's first album?" and the wrong answer is given by the system, there may be one or more likely issues that have caused the problem. One common issue may be that the answer given is actually an album by a different artist. In this case, the fact that gives Madonna as the creator of that album needs to be contradicted by the system. Another common issue may be that the answer given is not an album at all. The instance fact relied upon for this answer can then be contradicted by the system. The system can remedy the issue by replacing this incorrect fact with the correct alternative, such as in the case where the answer object is an EP rather than a full length studio album. Continuing the Madonna example, another common issue can be that the given answer does list an album by Madonna, but that the album was a later release and thus is not actually Madonna's first album. Yet another common issue can occur when all the facts about the answer object are correct, but some information is missing. For example, the database may be missing another album that was released earlier by Madonna.

Answers which collate multiple objects are more likely to have multiple issues that must be fixed by the system. For example, a question such as "What movies star Tom Cruise?" or "How many books did Agatha Christie write?" may have an answer which is generated by looking at many different objects. The most likely issues to occur in this situation may be issues like that the list of items has duplicate items (like counting the movie "Days of Thunder" twice), the list has missing items (such as only listing one of the "Mission Impossible" movies), the list may contain items which do not belong there (like listing that Tom Cruise starred in "Tropic Thunder" even though it was only a cameo), etc. A human interactive task system may be utilized to identify any of these issues. In some embodiments, the system may instead be automated to detect and resolve such issues.

The system may work in conjunction with other systems to remedy this issues. In some embodiments, there may be a separate system for determining these issues, such as whether an internal knowledge base contains duplicate entries. In some embodiments, the system can utilize automated processes or a human interactive task system. For example, these automated processes or human intelligence can collect the names of objects in the full list. The system can then add any names which do not map to entities that were returned in the answer as new objects to the database. The system can individually process the list to determine whether the list contains items that do not belong on the list. For example, the system can process a set of related questions about each object, such as "Is 'Tropic Thunder' a movie?" or "Is Tom Cruise in 'Mission Impossible?'"

When the system is unable to automatically fix a question it encounters, it can still partially process the question. This can allow the question to be fixed more quickly in the future, either by the system or some human intelligence resource, because the diagnostic steps have already been performed. This may also allow for prioritizing future work. For example, if a question contains a recognized entity but the question is not fully understood, the entity can be replaced by a class token to set the question up for future processing. In a more specific example, if two questions are processed about Germany and France respectively, both questions can be stored with the slot marked as "country." Another way to set questions may be by the type of problem afflicting them. For example, questions may be tagged as "poorly worded." A human interactive task system may be useful for this type of tagging.

The subroutine 200 ends at block 212.

Sample Environment for Implementing a Scalable Curation System

Figure 3:
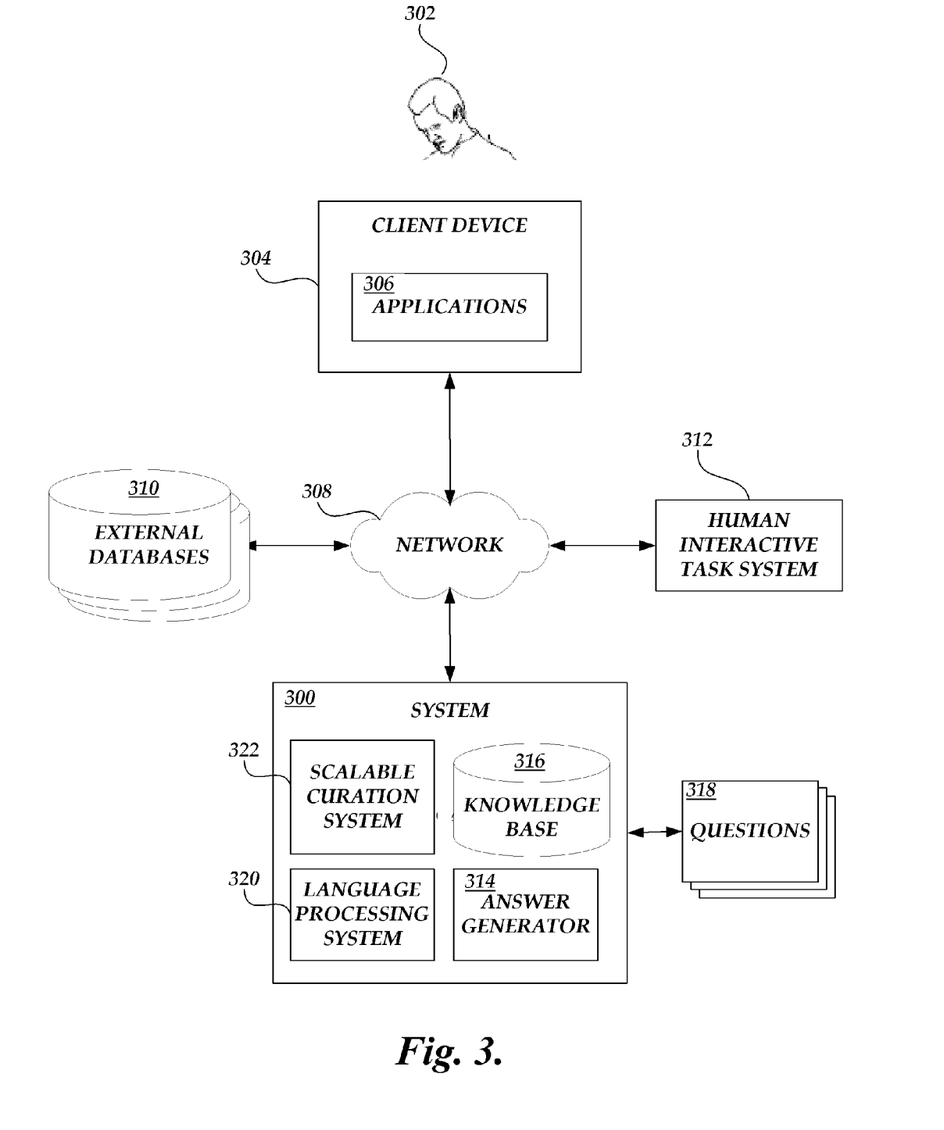
FIG. 3 is a block diagram of an illustrative networked environment containing a system that can generate high-quality answers to various user questions.

FIG. 3 illustrates an example environment in which the above question answering system may be utilized. It depicts a system 300 containing an answer generator 314 and a scalable curation system 320, and also illustrates a client device 304 and a specific user 302. The system 300 can include multiple subparts making up the single system 300. The subparts of the system 300 can be different systems that work together. The system 300 can include multiple subparts, some of which are different systems that work together. The system 300 is configured to run the process 100 and subroutine 200. The network-accessible system 300 can be in communication with the client device 304 via a communication network 308, such as a cellular telephone network or the internet. A user 302 may use the client device 304 to browse online, read, watch movies, submit utterances, receive information, and initiate various processes. For example, the user 302 can use the client device 304 for finding out the answer to a given question.

The client device 304 can correspond to a wide variety of electronic devices. In some embodiments, the client device 304 may be a mobile device that includes one or more processors and a memory which may contain one or more software applications 306 executed by the processors. The client device 304 can include a touchscreen or other interface component to allow the user 302 to interact with the client device 304. The client device 304 may include a speaker or other audio output component for presenting or facilitating presentation of audio content. In addition, the client device 304 may contain a microphone or other audio component for accepting speech input. Illustratively, the client device 304 may include any computing devices such as wireless mobile devices (e.g. smart phones, PDAs, tablets, or the like), desktops, laptops, media player, video game platforms, electronic book readers, television set-top boxes, televisions (e.g., internet TVs), and computerized appliances, to name a few. The software of the client device 304 may include components for establishing communications over wireless communication networks or directly with other computing devices.

The system 300 can be any computing system that is configured to communicate via a communication network. For example, the system 300 can contain any number of server computing devices, desktop computing devices, mainframe computers, and the like. In some embodiments, the system 300 can include several devices physically or logically grouped together, such as an application server computer device and a database server computing device. The system 300 can include an answer generator 314, a knowledge base 316, a language processing module 320, and a scalable curation system 322. In some embodiments, the system 300 can utilize a language processing module 320 separate from the system 300. The language processing module 320 can be logically grouped with the system 300 even if it is not contained within the system 300.

In some embodiments, the system 300 can include various models and components combined on a single device, multiple instances of a single model or component, etc. For example, the system 300 may include a separate database server that may be configured with or have access to multiple external databases 310; a server or group of servers configured with the system 300; and a server or group of servers configured with one or more applications 312. In multi-device implementations, the various devices of the system 300 may communicate via an internal communication network, such as a corporate or university network configured as a local area network ("LAN") or a wide area network ("WAN"). In some cases, the devices of the system 300 may communicate over an external network, such as the Internet, or a combination of internal and external networks.

In some embodiments, the features and services provided by the 300 may be implemented as web services consumable via a communication network 308. In further embodiments, the system 300 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the user 302 may direct some question at the client device 304. The client device 304 may communicate with the 300 via a communication network 308. As mentioned above, the system 300 may be a question-answering system separate from the system 300. The question-answering system 300 can be a scalable curation system 322. In some embodiments, the question-answering system 300 can contain a separate scalable curation system 322. The separate scalable curation system 322 can be accessible by a network 308. The network 308 may be a publicly accessible network of linked networks, possibly operated by various distinct parties, such as the Internet. In other embodiments, the network 308 may include a private network, personal area network ("PAN"), LAN, WAN, cable network, satellite network, etc. or some combination thereof, each with access to and/or from the Internet. For example, the devices of the system 300 may be located within a single data center, and may communicate via a private network as described above. The client device 304 may communicate with the system 300 via the Internet. The client device 304 may have access to the Internet via a wired or WiFi connection, or via a cellular telephone network (e.g., a Long Term Evolution or LTE network).

The system 300 may contain an answer generator 314. The answer generator 314 may receive information from a knowledge base 316 and use this information to generate a response for the user 302. In some embodiments, the knowledge base 316 may be stored locally on the client device 304 and communicate via an internal communication network. In other embodiments, the internal knowledge base 112 may communicate via a communication network 308. The system 300 can have previously processed sets of questions 318, as described in FIG. 1 and FIG. 2, in order to improve the quality of answers provided to the user 302 in response to a user question.

The answer generator 314 may generate an answer to a user question. The user question is an input to the system 300. For example, the user question can be a speech input and processed by a spoken language processing system. In another example, the user question can be a textual input and processed by a language processing module 320. The language processing module 320 can be contained within the system 300. The language processing module 320 can communicate with the system 300 via a communication network 308.

The answer generator 314 may generate an answer for the user 302 in response to the user's question. The answer may be delivered as audio output, textual output, or some other media content output. For example, if the user 302 asks, "What was the name of the last album released by the Beatles?" the answer generator 314 may use the internal knowledge base 316. The internal knowledge base 316 can provide the answer generator 314 with the titles of various albums released by the band The Beatles as well as the release dates of each album. The answer generator 314 can then determine the answer to the user's question, e.g., "Let It Be."

The knowledge base 316 can include information compiled from a variety of sources. Such a knowledge base may include facts or entries. The knowledge base 316 may additionally include data relationships based on interactions with users as well as other contextual information. The knowledge base 316 may relate different concepts, characters, locations, etc. to each other. The knowledge base 316 can contain information from dictionaries, encyclopedias, maps, novels, biographies, internet encyclopedias, etc. Entities in the database may be flagged or tagged. A given entity can have multiple flags or tags. These flags can include strings. These tags may indicate information about an entity, and help the answer generator 314 distinguish the most likely answer for a given topic when generating an answer to a question.

For example, the knowledge base 316 can tag two separate entities as having the given name "William Clinton." One entity may refer to the former United States president, William Jefferson Clinton. The other entity may be a corporate executive at a lesser-known business. While the former president's given name is William Clinton, because the former president is much more commonly known by "Bill Clinton" or "William Jefferson Clinton," the entity referring to the former president can be tagged such that the answer generator 314 understands that a user 302 asking about a "William Clinton" is more likely to be inquiring about the corporate executive who only goes by the name "William Clinton" rather than the much more well-known president who goes by "Bill Clinton" or "William Jefferson Clinton." The scalable curation system 322 can indicate that additional information is needed to remedy an answer to a given question. The system 300 can pull information from external databases 310 as needed when processing a question. For example, if the knowledge base 316 does not contain sufficient information to answer the question, the system 300 may draw additional information from the external databases 310 that the scalable curation system 322 has identified as necessary. These external databases 310, such as websites available through the Internet, may not contain tagged entities like the knowledge base 316. As a result, higher quality answers may come from the knowledge base 316. The knowledge base 316 may be updated with additional information as needed.

In some embodiments, the system 300 can receive a question from a set of question 318 rather than from a user 302. The system 300 can process the set of questions 318 to determine an answer for each question. The system 300 can determine a high-quality answer for each question. The system 300 can use a human interactive task system 312 to improve the answers to these questions. The system 300 can store the answers to the questions. The system 300 can store data relevant to answering these questions in a knowledge base 316. The set of question 318 may contain questions from a user 302 for which the user 302 did not want a real-time answer.

When asked a question by a user 302, the answer generator 314 can determine whether it can generate an answer to the question. Specifically, the system 300 can be trained on sets of pre-organized sets of questions 318. In some embodiments, the system 300 can then determine whether the question is known to the system 300 and that the system 300 is able to answer the question. In some embodiments, the system 300 can determine whether it recognizes the type of question and has the necessary information to determine the answer to that question. If the question cannot be answered by the system 300, the answer generator 314 can determine whether the user 302 would like the answer generator 314 to determine the answer.

When the scalable curation system 322 is determining whether a generated answer is high quality, the system 300 can, in some embodiments, utilize human intelligence from a human interactive task system 312. For example, the human interactive task system 312 can comprise individuals performing tasks for monetary payments. In some embodiments, the task can involve presenting the human intelligence resource 312 with a question and the answer generated by the answer generator 314. The human interactive task system 312 can indicate whether the answer is correct and of high quality, as described above in processes 100 and 200 of the application. The system 300 can utilize automated processes instead of or in conjunction with the human interactive task system 312.

Determining an Answer to an Unanswered Question in Real-Time

Figure 4:
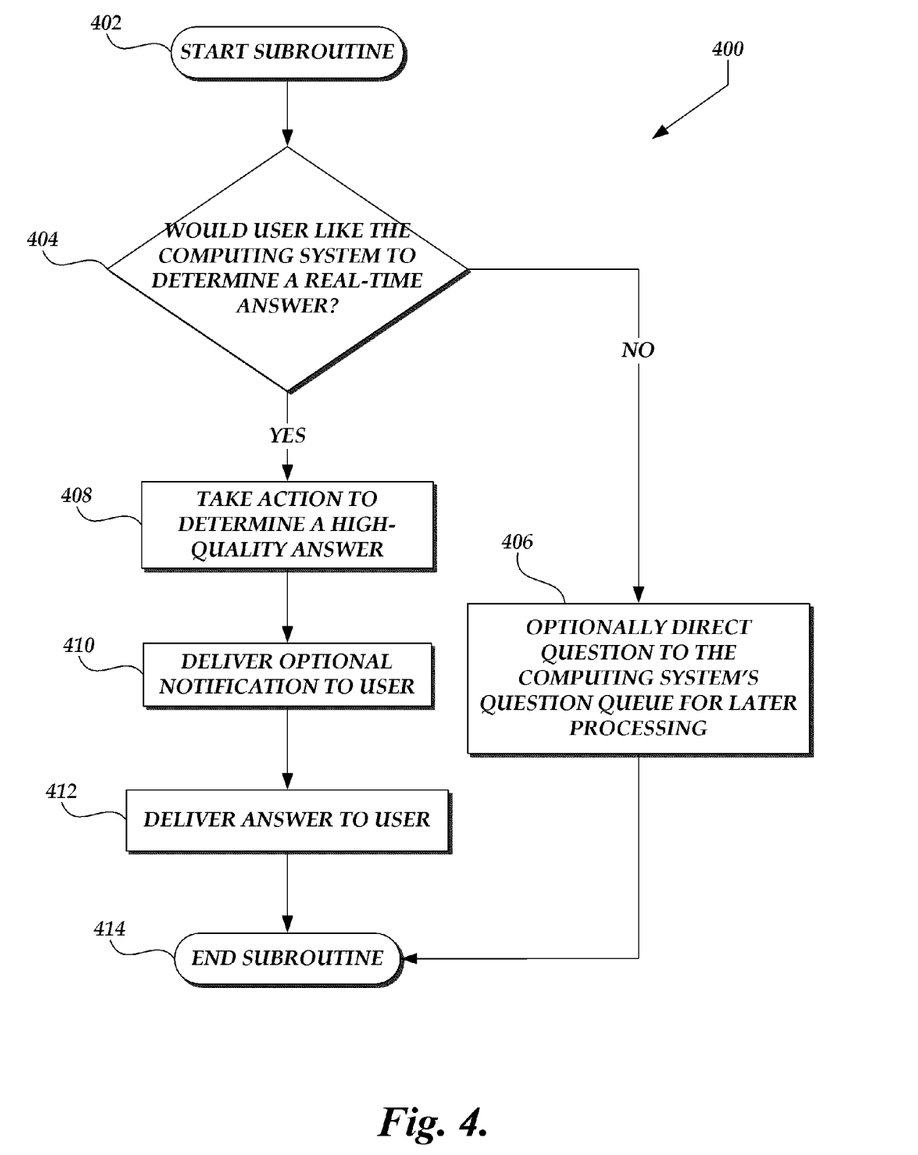
FIG. 4 is a flow diagram of an illustrative subroutine for determining a high-quality answer to a user question in real-time using the scalable curation system and notifying the user when the answer has been generated.

FIG. 4 depicts an illustrative subroutine 400 for using the system 300 to determine a real-time answer to a question based on a question from a user 302. The process involves determining whether the question has already been answered by the system 300, or whether the system 300 should determine an answer to an unanswered user question in real-time. The system 300 can include multiple subparts making up a single system 300. The subparts of the system 300 can be different systems that work together. The system 300 can include multiple subparts, some of which are different systems that work together. This subroutine may begin at block 110 of process 100, as shown in FIG. 1.

The subroutine 400 begins at block 402. The subroutine 400 may be embodied in a set of executable program instructions stored on a computer-readable medium, such as one or more disk drives, of a computer system. When the subroutine 400 is initiated, the executable program instructions can be loaded into memory, such as RAM, and executed by one or more processors of the computing system.

As discussed above, process 100 can involve obtaining a question from a user 302 rather than from a set of questions. The user 302 can question the system 300 using textual input, spoken input, physical gesture, or any combination thereof. For example, the user 302 may type a question into a client device 304 such as "What was the name of the last album released by the Beatles?" The user 302 may direct a verbal question to a client device 304, such as asking, "What is the weather forecast for today?" In another example, the user 302 may point to an image of an animal on a webpage displayed by the client device 304 and ask the client device 304, "What's the name of that animal?"

An optimal user experience may involve delivering responses to user questions as soon as possible. However, the system 300 may not be trained on all questions. The system 300 can determine whether or not the answer to the question is already known (or whether the answer to a similar question is known, indicating that the system 300 can easily generate the answer to the current question). If the answer is already known, and the system 300 has determined that the answer is a high-quality answer using the process 100 and subroutine 200 described above in detail in this application, the system 300 can deliver the high-quality known answer to the user 302.

If, however, the system 300 does not know the answer to the question and the system 300 must collect additional information to determine the answer, the system 300 may determine whether the user 302 would like the system 300 to discover the answer at block 404. Asking the user 302 whether the user 302 would like to know the answer to a question even if the system 300 cannot deliver an immediate answer can enhance the experience of the user 302. The user 302 can be notified that the system 302 will leave the user 302 alone and determine the answer. For example, if the user 302 directs the question to the client device 304, the client device may contain an application 306 connected to the scalable curation system 300. The application 306 can generate a message stating, "I don't know. Would you like me to determine the answer for you?" The user 302 can then say yes or no.

If the user 302 does not wish to wait for an answer to the user question, the system 300 will not deliver an answer to the user 302. In some embodiments, the system 300 will instead deliver the most likely answer it can generate. At block 406, the system 300 can optionally direct the user's question to the system's question queue for later processing. This can allow the system 300 to improve answer quality while not requiring the user 302 to wait for the system 300 to process the question. The system 300 may further refine itself by determining an answer to the user question and storing data related to the answer so as to improve the system 300 for any future inquiries from the same user 302 or other users. In other embodiments, the subroutine 400 will simply end at block 414 if the user 302 indicates that the user 302 does not wish to wait for an answer from the system 300.

However, if the user 302 indicates that the user 302 would like to know the answer to the question and does not mind waiting for the system 300 to determine an answer to the question, the system 300 can generate an answer to the question in real-time at block 408. The system 300 may have to search for additional data that is missing from the knowledge base 316 of the system 300. The system 300 may find this information using external databases 310. In some embodiments, the system 300 may determine a high-quality answer to the question of the user 302 by utilizing process 100 and subroutine 200 in order to determine a quality answer. The system 300 may be able to determine whether the answer is quality through various automated processes. In some embodiments, the system 300 can utilize a human interactive task system to determine a high-quality answer to the question of the user 302 in real-time, without requiring the user to provide additional information. This can improve the user experience.

When the system 300 has determined an answer to the user question, the system 300 may optionally generate and deliver a user notification at block 410. For example, if the user 302 asks a mobile phone, "What is the highest rated Italian restaurant that delivers to my address past 10 pm?" the user 302 does not have to watch the mobile phone until the mobile phone delivers an answer to the user question. The system 300 can process an answer to the question while the user 302 does other unrelated tasks.

Upon determining the answer to the question, the system 300 can generate a notification for the user 302. The system 300 can deliver the notification to the client device 304. For example, if the user 302 is utilizing a question-answer application 306 on the client device 304, the application 306 can display a notification on the client device 304. The user 302 is then aware that the system 300 has determined an answer to the question. In a more specific example, the application connected to the system 300 can deliver an e-mail notification or a push notification to the user's mobile.

The user may then receive the answer to the question at block 412. The answer may be delivered as an output on the client device 304. The output can be audio, visual, written, or a mixture of all three. For example, the output may be a written output coupled with a video. In another example, the output can be audio output in response to the user's spoken question. The system 300 may deliver the answer to the user 302 along with a notification to the user 302.

The process ends at block 414.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and one or more processors in communication with the computer-readable memory, wherein the one or more processors are programmed by the executable instructions to at least:

obtain a question for processing;

determine that the system is not able to understand the question;

take a first action to enable the system to understand the question;

determine that the system is not able to determine an initial answer to the question utilizing information stored in a knowledge base;

take a second action to enable the system to determine the initial answer;

determine the initial answer;

determine that a quality level associated with the initial answer is less than a threshold; and take a third action to enable the system to determine a new answer having a higher quality level than the quality level of the initial answer.

2. The system of claim 1, wherein the determination that the system is not able to understand the question comprises one or more of: determining that the question does not match a template, determining that a part of the question does not match a template, determining that the system does not understand an entity in the question, determining that the system does not understand a relationship in the question, or determining that the system is unable to choose between two or more possible understandings.

3. The system of claim 1, wherein the first action comprises one or more of: identifying alternative strings related to an entity in the question, substituting a known entity in the question to determine that the system can answer the question using the known entity, determining a similar question to determine that the system can answer the similar question, or sending the question to a human interactive task system.

4. The system of claim 1, wherein the second action comprises one or more of: breaking the question into one or more related questions and answering the one or more related questions utilizing information stored in the knowledge base, performing natural language processing on a text source to obtain additional information, or sending the question to a human interactive task system.

5. The system of claim 1, wherein the quality level is determined by one or more of: receiving information regarding the quality level of the initial answer from a human interactive task system, receiving information regarding the quality level of the initial answer from a user, determining that the initial answer is factually incorrect, determining that the initial answer contains unnecessary information, determining that the initial answer does not include necessary information, determining that the initial answer is not grammatically correct, determining that the initial answer contains duplicative information, or determining that the initial answer is not in an expected format.

6. The system of claim 1, wherein the third action comprises one or more of: utilizing information stored in an external database, performing natural language processing on a text source to obtain additional information, removing unnecessary information from the initial answer, adding necessary information to the initial answer, or sending information to a human interactive task system.

7. The system of claim 1, wherein the second action comprises receiving a request from a user to determine the initial answer using a human interactive task system.

8. The system of claim 7, wherein the second action further comprises sending a notification to the user after the system receives the new answer from the human interactive task system.

9. A computer-implemented method comprising:

under control of one or more computing devices configured with specific computer-executable instructions, obtaining a question for processing;

determining that the one or more computing devices are not able to understand the question for processing;

taking a first action to enable the one or more computing devices to understand the question;

determining that the one or more computing devices are not able to answer the question;

taking a second action to determine the answer;

determining the answer;

determining that a quality level associated with the answer is less than a threshold; and taking a third action to determine a new answer having a higher quality level than the quality level of the answer.

10. The one or more non-transitory computer readable media of claim 9, wherein determining that the one or more computing devices are not able to answer the question for processing comprises one or more of: determining that the question does not match a template, determining that a part of the question does not match a template, determining that the system does not understand an entity in the question, determining that the system does not understand a relationship in the question, or determining that the system is unable to choose between two or more possible understandings of the question.

11. The one or more non-transitory computer readable media of claim 9, wherein the first action comprises one or more of: identifying alternative strings related to an entity in the question, substituting a known entity in the question to determine that the system can answer the question using the known entity, determining a similar question to determine whether the system can answer the similar question, or sending the question to a human interactive task system.

12. The one or more non-transitory computer readable media of claim 9, wherein the second action comprises one or more of: breaking the question into one or more related questions and answering the one or more related questions utilizing information stored in the knowledge base, performing natural language processing on a text source to obtain additional information, or sending the question to a human interactive task system.

13. The one or more non-transitory computer readable media of claim 9, wherein the quality level is determined by one or more of: receiving information regarding the quality level of the answer from a human interactive task system, receiving information regarding the quality level of the answer from a user, determining that the answer is factually incorrect, determining that the answer contains unnecessary information, determining that the answer does not include necessary information, determining that the answer is not grammatically correct, determining that the answer contains duplicative information, or determining that the answer is not in an expected format.

14. The one or more non-transitory computer readable media of claim 9, wherein the third action comprises one or more of: utilizing information stored in an external database, performing natural language processing on a text source to obtain additional information, removing unnecessary information from the answer, adding necessary information to the answer, or sending information to a human interactive task system.

15. The one or more non-transitory computer readable media of claim 9, wherein the process further comprises providing the improved answer to a user.

16. One or more non-transitory computer readable media comprising executable code that, when executed, cause one or more computing devices to perform a process comprising:
   determining that the one or more computing devices are not able to understand a question;
   taking a first action to enable the one or more computing devices to understand the question;
   determining that the one or more computing devices are not able to answer the question;
   taking a second action to enable the one or more computing devices to answer the question;
   determining the answer;
   determining a quality level associated with the answer; and
   taking a third action to enable the one or more computing devices to determine a new answer having a higher quality level than the quality level of the answer.

17. The one or more non-transitory computer readable media of claim 14, wherein determining whether the one or more computing devices are able to process a question comprises one or more of: determining that the question does not match a template, determining that a part of the question does not match a template, determining that the system does not recognize an entity in the question, determining that the system cannot process a relationship in the question, or determining that the one or more computing devices are unable to choose between two or more possible interpretations of the question.

18. The one or more non-transitory computer readable media of claim 16, wherein the first action comprises one or more of: identifying alternative strings related to an entity in the question, substituting a known entity in the question to determine that the system can answer the question using the known entity, determining a similar question to determining that the system can answer the similar question, or sending the question to a human interactive task system.

19. The one or more non-transitory computer readable media of claim 16, wherein the second action comprises one or more of: breaking the question into one or more related questions and answering the one or more related questions utilizing information stored in the knowledge base, performing natural language processing on a text source to obtain additional information, or sending the question to a human interactive task system.

20. The one or more non-transitory computer readable media of claim 16, wherein increasing the quality level of the answer comprises one or more of: utilizing information stored in an external database, performing natural language processing on a text source to obtain additional information, removing unnecessary information from the answer, adding necessary information to the answer, or sending information to a human interactive task system.

21. The one or more non-transitory computer readable media of claim 16, wherein the question is obtained from a user.

22. The one or more non-transitory computer readable media of claim 21, wherein the process further comprises providing the new answer to a user.

23. The one or more non-transitory computer readable media of claim 16, wherein the question is obtained from a set of questions stored in the memory of the one or more computing devices.

* * * * *